Patented Aug. 23, 1932

1,872,716

UNITED STATES PATENT OFFICE

HANS FINKELSTEIN AND FRIEDRICH ACHTERBERG, OF UERDINGEN, GERMANY, ASSIGNORS TO I. G. FARBENINDUSTRIE AKTIENGESELLSCHAFT, OF FRANKFORT-ON-THE-MAIN, GERMANY

PROCESS FOR THE MANUFACTURE OF COMPOUNDS CONTAINING ALUMINUM AND FLUORINE

No Drawing. Application filed May 17, 1930, Serial No. 453,406, and in Germany May 18, 1929.

The present invention concerns the manufacture of compounds containing aluminum and fluorine by precipitating sparingly soluble compounds from solutions containing the complex compound $AlF_3.AlCl_3$. The process may be carried out by adding acid fixing agents to the solutions containing the complex compound $AlF_3.AlCl_3$ until basic aluminum salts are precipitated. Another mode of procedure consists in precipitating from solutions containing the complex $AlF_3.AlCl_3$ and dissolved salts of alkaline earth metals first the alkaline earth metal compounds as sparingly soluble salts and then converting the complex compound $AlF_3.AlCl_3$ in the solution now free from alkaline earth metal compounds into an insoluble form. Alternatively the solution free from alkaline earth metal compounds and containing the complex $AlF_3.AlCl_3$ may be converted into a sparingly soluble double salt of alkali fluoride and aluminum fluoride.

Our co-pending application No. 453,405 describes a process for bringing practically all the fluorine in sparingly soluble substances containing fluorine into solution by treatment with aluminum chloride. By this means solutions are obtained, containing the readily soluble complex compound

This cannot be easily obtained from the solutions in the solid state by evaporation.

In accordance with the present invention solid compounds containing aluminum and fluorine can be isolated from the above specified solutions by converting the complex $AlF_3.AlCl_3$ into sparingly soluble conversion products. This can be carried out by two methods. In the first place it is possible by adding to the solution carbonates or hydroxides of alkali or alkaline earth metals or other acid fixing agents to convert the complex $AlF_3.AlCl_3$ into sparingly soluble basic aluminum salts, in the second place it can be converted with alkali fluorides into sparingly soluble double salts. When the solution containing the complex $AlF_3.AlCl_3$ is neutralized, for example, with calcium hydroxide until it no longer displays any acid reaction, there is obtained a precipitate free from calcium and poor in chlorine, which is found to be a basic aluminum fluoride.

The precipitates thus obtainable are readily soluble in caustic alkali lyes. By starting from solutions from which all colloidally dispersed constituents have been carefully removed coarse grained precipitates can be obtained, which after drying at 100° C. no longer dissolve in hot dilute acids and possess a particularly low chlorine content.

When the solution containing the complex $AlF_3.AlCl_3$ is produced from fluorine compounds or minerals containing calcium all the calcium passes into solution along the fluorine. In order to work up these solutions to solid sparingly soluble compounds of non-basic nature it is requisite previously to remove all calcium therefrom. This is attained in the known manner, for example, by the addition of sulphuric acid or an alkali metal sulphate. The solution free from alkaline earth metal compounds can then be converted, for example, with sodium fluoride into sparingly soluble double salts, which, when sufficient alkali fluoride is used, for example, when the process is carried out according to the equation:

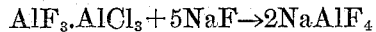

is practically free from chlorine or $SO_4$.

The following examples will further illustrate the invention:

Example 1

130 parts by weight of concentrated sulphuric acid are added to a solution obtainable by boiling 80 parts of calcium fluoride with a solution of 180 parts of aluminum chloride in 500 parts of water and the precipitate of calcium sulphate produced is filtered with suction. The filtrate is freed from free hydrochloric acid by evaporation, separated from the last remnants of subsequently precipitated calcium sulphate and an aqueous suspension of 140 parts of sodium fluoride is added. The precipitate is filtered with suction and washed. There are obtained 210 parts of a hydrated double salt containing 46.3 per cent of fluorine.

Example 2

The same starting solution as in example 1 is filtered and at boiling temperature milk of lime is added until litmus still just shows an acid reaction. The precipitate formed is filtered with suction and washed as long as the wash water still carries off calcium. There are obtained 120 parts of a precipitate, soluble after drying in caustic soda, but insoluble in dilute acids and containing about 30 per cent of aluminum, 35 per cent of fluorine and less than 1 per cent of chlorine. This corresponds nearly to the formula of an aluminum hydroxy fluoride $AlF_3.Al(OH)_3$.

In the following claims the term "acid fixing agents" is used to denote bases and salts of acids weaker than hydrochloric acid.

We claim:

1. Process for the manufacture of a compound containing aluminum and fluorine which consists in adding an acid fixing agent to a solution containing aluminum, fluorine and chlorine in the ratio of at least two equivalents of aluminum and one equivalent of chlorine for each one equivalent of fluorine, corresponding to the formula $AlF_3.AlCl_3$.

2. Process for the manufacture of a compound containing aluminum and fluorine which consists in adding an alkaline reacting agent to a solution containing aluminum, fluorine and chlorine in the ratio of at least two equivalents of aluminum and one equivalent of chlorine for each one equivalent of fluorine, corresponding to the formula $$AlF_3.AlCl_3.$$

3. Process for the manufacture of a compound containing aluminum and fluorine which consists in adding calcium hydroxide to a solution containing aluminum, fluorine and chlorine in the ratio of at least two equivalents of aluminum and one equivalent of chlorine for each one equivalent of fluorine, corresponding to the formula $AlF_3.AlCl_3$.

4. As a new product a compound containing aluminum and fluorine nearly corresponding to the formula of an aluminum hydroxyfluoride $AlF_3.Al(OH)_3$, being insoluble in water but soluble in caustic alkali lye.

In testimony whereof, we affix our signatures.

HANS FINKELSTEIN.
FRIEDRICH ACHTERBERG.